(12) United States Patent
Ueda et al.

(10) Patent No.: US 9,567,873 B2
(45) Date of Patent: Feb. 14, 2017

(54) DISC AXIS ADJUSTING MECHANISM IN GAS TURBINE

(71) Applicant: MITSUBISHI HEAVY INDUSTRIES, LTD., Tokyo (JP)

(72) Inventors: Motoharu Ueda, Tokyo (JP); Eigo Katou, Tokyo (JP); Eisaku Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 372 days.

(21) Appl. No.: 14/376,035

(22) PCT Filed: Feb. 8, 2013

(86) PCT No.: PCT/JP2013/053113
§ 371 (c)(1),
(2) Date: Oct. 22, 2014

(87) PCT Pub. No.: WO2013/118880
PCT Pub. Date: Aug. 15, 2013

(65) Prior Publication Data
US 2015/0078887 A1    Mar. 19, 2015

(30) Foreign Application Priority Data
Feb. 10, 2012  (JP) ................................. 2012-027334
Feb. 23, 2012  (JP) ................................. 2012-037719

(51) Int. Cl.
*F01D 9/02* (2006.01)
*F01D 25/14* (2006.01)
(Continued)

(52) U.S. Cl.
CPC ............... *F01D 25/305* (2013.01); *F01D 9/02* (2013.01); *F01D 9/065* (2013.01); *F01D 11/24* (2013.01);
(Continued)

(58) Field of Classification Search
CPC .......... F01D 25/162; F01D 25/30; F01D 9/02; F01D 25/14; F01D 25/305; F01D 9/065; F01D 11/24; F01D 17/02; F01D 21/04; F05D 2270/804; F05D 2220/32; F05D 2260/941; F05D 2270/821; F05D 2270/303; F02C 7/18; F02C 7/20
See application file for complete search history.

(56) References Cited

U.S. PATENT DOCUMENTS 8,123,406 B2 * 2/2012 Erickson .................. F01D 9/04
374/141
8,616,827 B2 * 12/2013 O'Leary ................. F01D 11/24
415/1
(Continued)

FOREIGN PATENT DOCUMENTS

JP    2003-239705 A    8/2003
JP    2007-192028 A    8/2007
(Continued)

OTHER PUBLICATIONS

Extended European Search Report dated Nov. 26, 2015, issued in counterpart European Patent Application No. 13746013.5. (8 pages).
(Continued)

*Primary Examiner* — Igor Kershteyn
(74) *Attorney, Agent, or Firm* — Westerman, Hattori, Daniels & Adrian, LLP

(57) ABSTRACT

In a disc axis adjusting mechanism in a gas turbine, the gas turbine has an exhaust gas diffuser provided between a casing wall and a bearing case which are connected to a downstream side of a turbine, a plurality of struts provided at intervals in a circumferential direction, and strut covers coupling an outer diffuser and an inner diffuser of the exhaust gas diffuser so as to cover the struts, and the
(Continued)

mechanism comprises: a plurality of air introduction holes formed in the casing wall so as to allow the interior and exterior of the wall to communicate with each other; a sensor unit configured to detect a parameter corresponding to the thermal elongation of each of the struts; and a flow rate adjustor configured to adjust the flow rate of air flowing through each of the air introduction holes based on a detection value detected by the sensor unit.

20 Claims, 14 Drawing Sheets

(51) Int. Cl.
| | | |
|---|---|---|
| F01D 25/30 | (2006.01) | |
| F02C 7/18 | (2006.01) | |
| F01D 25/16 | (2006.01) | |
| F02C 7/20 | (2006.01) | |
| F01D 9/06 | (2006.01) | |
| F01D 11/24 | (2006.01) | |
| F01D 17/02 | (2006.01) | |
| F01D 21/04 | (2006.01) | |

(52) U.S. Cl.
CPC .............. *F01D 17/02* (2013.01); *F01D 21/04* (2013.01); *F01D 25/14* (2013.01); *F01D 25/162* (2013.01); *F01D 25/30* (2013.01); *F02C 7/18* (2013.01); *F02C 7/20* (2013.01); *F05D 2220/32* (2013.01); *F05D 2260/941* (2013.01); *F05D 2270/303* (2013.01); *F05D 2270/804* (2013.01); *F05D 2270/821* (2013.01)

(56) References Cited

U.S. PATENT DOCUMENTS

| | | | | |
|---|---|---|---|---|
| 8,894,358 | B2* | 11/2014 | Bacic | F01D 11/20 |
| | | | | 415/126 |
| 8,936,429 | B2* | 1/2015 | Gaully | F01D 11/24 |
| | | | | 415/1 |
| 2006/0140754 | A1* | 6/2006 | Tanioka | F01D 11/24 |
| | | | | 415/173.1 |
| 2008/0063509 | A1 | 3/2008 | Sutherland et al. | |
| 2009/0053035 | A1 | 2/2009 | Zhang et al. | |
| 2010/0296912 | A1 | 11/2010 | McCallum et al. | |
| 2010/0322759 | A1 | 12/2010 | Tanioka | |

FOREIGN PATENT DOCUMENTS

| | | |
|---|---|---|
| JP | 2009-243311 A | 10/2009 |
| JP | 2010-270757 A | 12/2010 |
| JP | 4681458 B2 | 5/2011 |
| JP | 2011-127447 A | 6/2011 |

OTHER PUBLICATIONS

International Search Report of PCT/JP2013/053113, mailing date of Apr. 16, 2013, w/English translation (3 pages).
Written Opinion of PCT/JP2013/053113, mailing date of Apr. 16, 2013, w/English translation (9 pages).

* cited by examiner

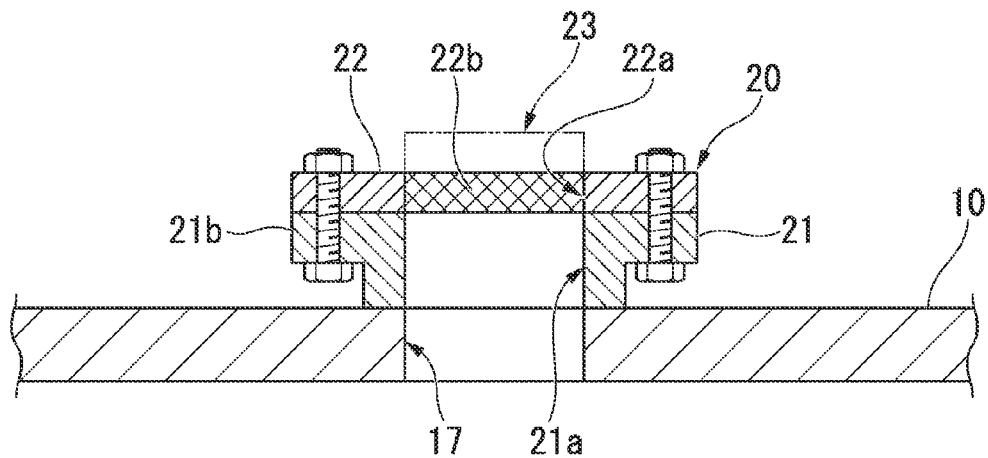
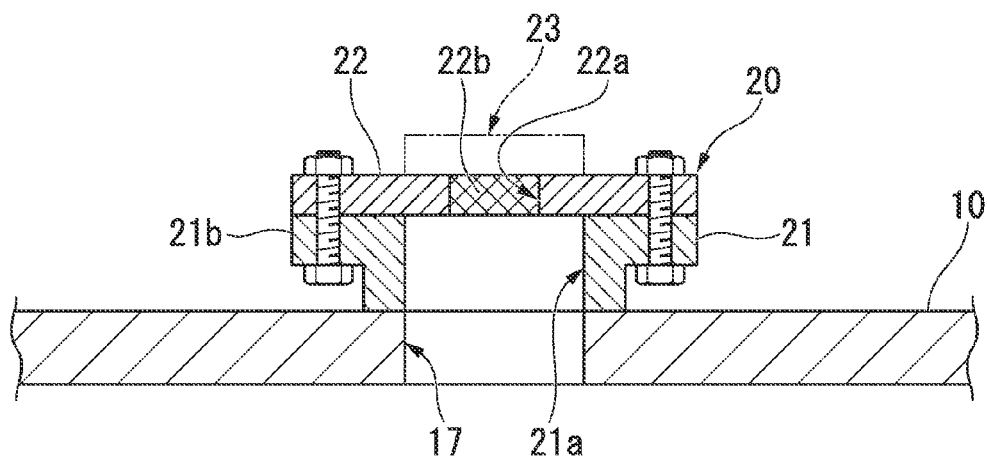

DISC AXIS ADJUSTING MECHANISM IN GAS TURBINE

TECHNICAL FIELD

The present invention relates to a disc axis adjusting mechanism provided in a gas turbine exhaust section of a gas turbine.

Priority is claimed on Japanese Patent Application No. 2012-027334, filed on Feb. 10, 2012, and Japanese Patent Application No. 2012-037719, filed on Feb. 23, 2012, the contents of which are incorporated herein by reference.

BACKGROUND ART

In the related art, in a turbine section of a gas turbine, an exhaust gas diffuser of a duplex tube structure connected to a combustion gas outlet of the turbine is used in order to recover the static pressure of a combustion gas from the turbine. However, in general, a gas turbine exhaust section including the exhaust gas diffuser is also an object to be cooled.

Usually, the gas turbine exhaust section is generally configured to include an exhaust gas diffuser having an outer diffuser and an Inner diffuser; an exhaust cavity having a casing wall and a bearing case provided so as to cover this exhaust gas diffuser; struts that couple the casing wall and the bearing case through the exhaust gas diffuser; and strut covers that couple the outer diffuser and the inner diffuser so as to cover the struts.

In such a gas turbine, for example, a cooling structure adapted to promote substitution of air within each strut or an exhaust tunnel, using a cooling system, and to enhance the cooling effect of the gas turbine exhaust section is disclosed in PTL 1.

PTL 1 describes a structure including the cooling system in which an air intake port that allows an exhaust tunnel communicating with an exhaust cavity through an exhaust gas diffuser on a downstream side of the exhaust cavity to communicate with a casing exterior is provided inside the exhaust gas diffuser, and air introduced from this air intake port is emitted from a space between the strut and the strut cover to the outside of the exhaust cavity through a pipe as suction exhaust means.

CITATION LIST

Patent Literature

[PTL 1] Japanese Patent No. 4681458

SUMMARY OF INVENTION

Technical Problem

However, in the cooling structure provided in the related-art gas turbine exhaust section disclosed in PTL 1, the volume of air to be supplied to a space between the strut and the strut cover is not controlled. Therefore, there is a concern that a variation may be caused in the amount of air supplied. In that case, a temperature difference is caused between the struts, and thereby, the thermal elongation deviation in a length direction (direction closer to or away from a rotor) is caused in each strut. As a result, there is a concern that the axis of the rotor may shift. Also, since the shift of the axis causes the deviation of the clearance between each turbine blade supported by the rotor and the casing wall, rubbing or the like may occur.

Additionally, when the rigidity of the strut is insufficient, the axis may shift due to the weight of the rotor, and continuous monitoring is required. As a result, there is room for improvement in this respect.

The present invention has been made in view of the above-described problems, and an object thereof is to provide a disc axis adjusting mechanism in a gas turbine that can adjust the flow rate of air that cools struts, to thereby suppress deviation in the axis of the rotor, and enables the axis of the rotor to be monitored continuously.

Solution to Problem

A first aspect of the present invention is a disc axis adjusting mechanism in a gas turbine, wherein the gas turbine has an exhaust gas diffuser having an outer diffuser and an inner diffuser provided between a casing wall and a bearing case which are connected to a downstream side of the turbine, a plurality of struts that couple the casing wall and the bearing case through the exhaust gas diffuser and are provided at intervals in a circumferential direction, and strut covers that couple the outer diffuser and the inner diffuser so as to cover the struts. The mechanism of the first aspect of the present invention includes: a plurality of air introduction holes formed in the casing wall so as to correspond to each of the struts, and allow the interior and exterior of the wall to communicate with each other; a first sensor unit configured to detect a parameter corresponding to the thermal elongation of each of the struts; and a flow rate adjustor configured to adjust the flow rate of air flowing through each of the air introduction holes on the basis of a detection value detected by the first sensor unit.

In the first aspect of the disc axis adjusting mechanism of the present invention, the temperature of the strut can be lowered by making the air outside the casing wall flow between the strut and the strut cover from each of the plurality of air introduction holes provided in the casing wall. Also, the flow rate of air flowing through the air introduction hole can be changed by detecting the parameter corresponding to the thermal elongation of the strut, using the first sensor unit, and adjusting the flow rate adjustor on the basis of the detection value. For example, it is possible to calculate thermal elongation deviations of the plurality of struts on the basis of the respective thermal elongation amounts of the struts, specify a strut having a greater thermal elongation amount, and bring about a suitable flow rate of air to the specified strut, thereby performing cooling.

In this way, since the thermal elongation amount of the strut can be monitored and the thermal elongation amounts of the plurality of struts can be adjusted through cooling, the deviation of the axis of the rotor supported by the struts via the bearing case can be suppressed, and the deviation of clearance between each turbine blade supported by the rotor and the casing wall can also be suppressed.

According to the first aspect of the disc axis adjusting mechanism of the present invention, since the parameter corresponding to the thermal elongation of the strut can be monitored in real time by the first sensor unit, it is possible to continue an operation flow that adjusts the flow rate of air flowing through the air introduction hole on the basis of the above-described calculation. Therefore, the thermal elongation amounts of the plurality of struts can be equalized by continuing the operation flow, and the operation of the turbine can be continuously stabilized.

In the first aspect of the disc axis adjusting mechanism of the present invention, the first sensor unit may be a temperature sensor that detects the temperature of the strut.

In this case, the flow rate of air flowing through the air introduction hole can be changed by detecting the temperature of the strut, using the temperature sensor, calculating the thermal elongation amount from the detected temperature, and adjusting the flow rate adjustor.

In the first aspect of the disc axis adjusting mechanism of the present invention, the temperature sensor may be a thermocouple, and a plurality of the temperature sensors may be provided along a length direction of the strut.

In this case, since the temperatures of a plurality of places in the length direction of the strut can be detected, variations in the temperatures of the strut in the length direction become small and are equalized. Accordingly, the accuracy of the detection values can be enhanced, and the correction accuracy of the deviation of the axis of the rotor can be improved.

In the first aspect of the disc axis adjusting mechanism of the present invention, the first sensor unit may be a laser displacement gauge that is provided outside the casing wall, and causes a laser beam to pass through a region inside the strut cover having the strut interposed therein to measure the amount of displacement up to an outer peripheral portion of the bearing case.

In this case, the amount of displacement of the laser beam passing through the space between the strut and the strut cover from the position close to the strut to the portion close to the position of the bearing case where the strut is fixed can be measured by the laser displacement gauge. That is, since this amount of displacement corresponds to the dimension of the strut in the length direction, the flow rate of air flowing through the air introduction hole can be changed by calculating the thermal elongation amount of the strut from this displacement amount and adjusting the flow rate adjustor.

In the first aspect of the disc axis adjusting mechanism of the present invention, a partition plate may be provided to demarcate a space between the strut cover and an inner peripheral surface of the casing wall in the circumferential direction, and one strut may be arranged within a region demarcated by the partition plate.

In the present invention, a region demarcated by the partition plate corresponding to each strut is formed, and the air introduction hole is arranged in the casing wall within the region, so that the air introduction hole that individually corresponds to the strut can be provided. In this case, the flow rate of air flowing through the space between the strut and the strut cover can be stabilized, and the correction accuracy of the thermal elongation amount of the strut based on the detection value of the first sensor unit can be enhanced. Additionally, since the flow rate adjustor that corresponds to each strut can be adjusted, there is an advantage that it is also possible to simultaneously cool the plurality of struts, and it is possible to handle the thermal elongations of all the struts.

In the first aspect of the disc axis adjusting mechanism of the present invention, a displacement sensor may be provided in the casing wall to measure the displacement of the casing wall, and air may be blown against an outer peripheral surface of the casing wall on the basis of the displacement of the casing wall detected by the displacement sensor.

In the present invention, the displacement of the casing wall can be corrected by blowing air against the outer peripheral surface of the casing wall on the basis of the displacement of the casing wall detected by the displacement sensor, separately from the above-described first sensor unit that detects the parameter corresponding to the thermal elongation of the strut. Also, the flow rate adjustor can be adjusted by making the displacement of the casing wall correspond to the thermal elongation of the strut detected by the first sensor unit, and the deviation of the axis of the rotor can be adjusted based on the clearance between the casing wall and each turbine blade.

A second aspect of the present invention is a disc axis adjusting mechanism in a gas turbine, wherein the gas turbine has an exhaust gas diffuser having an outer diffuser and an inner diffuser provided between a casing wall and a bearing case which are connected to a downstream side of the turbine, a plurality of struts that couple the casing wall and the bearing case through the exhaust gas diffuser and are provided at intervals in a circumferential direction, and strut covers that couple the outer diffuser and the inner diffuser so as to cover the struts. The mechanism of the second aspect of the present invention includes: a plurality of air introduction holes formed in the casing wall so as to correspond to each of the struts, and allow the interior and exterior of the wall to communicate with each other; a second sensor unit configured to detect a clearance between a turbine blade and a turbine casing in the turbine; and a flow rate adjustor configured to adjust the flow rate of air flowing through each of the air introduction holes.

In the present invention, the temperature of the strut can be lowered by making the air outside the casing wall flow between the strut and the strut cover from each of the plurality of air introduction holes provided in the casing wall. Also, the flow rate of air flowing through the air introduction hole can be changed by detecting the clearance between the turbine blade and the turbine casing in the turbine, using the second sensor unit, and adjusting the flow rate adjustor on the basis of the detection value. In this case, it is possible to provide a plurality of the second sensor units in the circumferential direction of the turbine casing, calculate clearance deviations in the circumferential direction from the detection values of the second sensor units, specify a position having a greater clearance deviation among the second sensor units provided in the circumferential direction, and make a certain flow rate of air flow to the specified individual portion, thereby performing cooling. For example, during the operation of the turbine, when a temperature difference is caused in a vertical direction of the turbine casing and a clearance deviation is caused with a so-called "stoop deformation", the clearance can be optimized so that the thermal elongation of a strut arranged on a lower side become large, the air volume of a strut arranged on an upper side is increased, and the deviation of the axis of the rotor is intentionally brought close to that of an axis portion of the casing wall.

In this way, since the clearance between each turbine blade and the turbine casing can be monitored and the thermal elongation amounts of the plurality of struts can be adjusted through cooling, the deviation of the axis of the rotor supported by the struts via the bearing case can be suppressed, and the deviation of clearance between each turbine blade supported by the rotor and the turbine casing can also be suppressed.

In the second aspect of the disc axis adjusting mechanism of the present invention, the second sensor units may be provided in a plurality of stages along a turbine axial direction.

In this case, since variations in the detection values become small and are equalized by detecting and monitoring the clearances, using the plurality of stages of second sensor units, in the turbine axial direction, the accuracy of the detection values can be enhanced, and the correction accuracy of the deviation of the axis of the rotor can be improved.

In the second aspect of the disc axis adjusting mechanism of the present invention, the strut may be provided with a temperature sensor that detects the temperature of the strut.

Accordingly, the flow rate of air flowing through the air introduction hole can be changed by detecting the temperature of the strut, using the temperature sensor, calculating the thermal elongation amount from the detected temperature, and adjusting the flow rate adjustor. Therefore, since the flow rate adjustor can be adjusted on the basis of two parameters of the thermal elongation amount of the strut detected by the temperature sensor and the clearance detected by the above-described second sensor unit, the axis of the rotor can be optimized while maintaining the clearance between the rotor (turbine blade) and the turbine casing.

In the second aspect of the disc axis adjusting mechanism of the present invention, a displacement sensor may be provided in the casing wall to measure the displacement of the casing wall, and air may be blown against an outer peripheral surface of the casing wall on the basis of the displacement of the casing wall detected by the displacement sensor.

In the present invention, the displacement of the casing wall can be corrected by blowing air against the outer peripheral surface of the casing wall on the basis of the displacement of the casing wall detected by the displacement sensor, separately from the above-described second sensor unit that detects the clearance between the turbine blade and the turbine casing. Also, the flow rate adjustor can be adjusted by making the displacement of the casing wall correspond to the clearance between the turbine blade and the turbine casing detected by the second sensor unit, and the deviation of the axis of the rotor can be adjusted based on the clearance between the casing wall and each turbine blade.

Advantageous Effects of Invention

According to the first aspect of the disc axis adjusting mechanism in a gas turbine of the present invention, the flow rate of air flowing through the air introduction hole can be changed by detecting the parameter corresponding to the thermal elongation of the strut, using the first sensor unit, and adjusting the flow rate adjustor on the basis of the detection value, and thereby, the deviation of the axis of the rotor can be suppressed. Moreover, the effect that the axis of the rotor can be continuously monitored is exhibited.

According to the second aspect of the disc axis adjusting mechanism in a gas turbine of the present invention, the flow rate of air flowing through the air introduction hole can be changed by detecting the clearance between the turbine blade and the turbine casing, using the second sensor unit, and adjusting the flow rate adjustor on the basis of the detection value, and thereby, the deviation of the axis of the rotor can be suppressed. Moreover, the effect that the axis of the rotor can be continuously monitored is exhibited.

BRIEF DESCRIPTION OF DRAWINGS

FIG. 4A is a cross-sectional view of a flow rate adjusting valve.

FIG. 4B is a cross-sectional view showing a modification example of the flow rate adjusting valve.

DESCRIPTION OF EMBODIMENTS

Hereinafter, disc axis adjusting mechanisms in gas turbines according to embodiments of the present invention will be described with reference to the drawings. Such embodiments show aspects of the present invention, and the present invention is not limited to this and can be arbitrarily changed within the scope of the technical idea of the present invention.

First Embodiment

Figure 1:
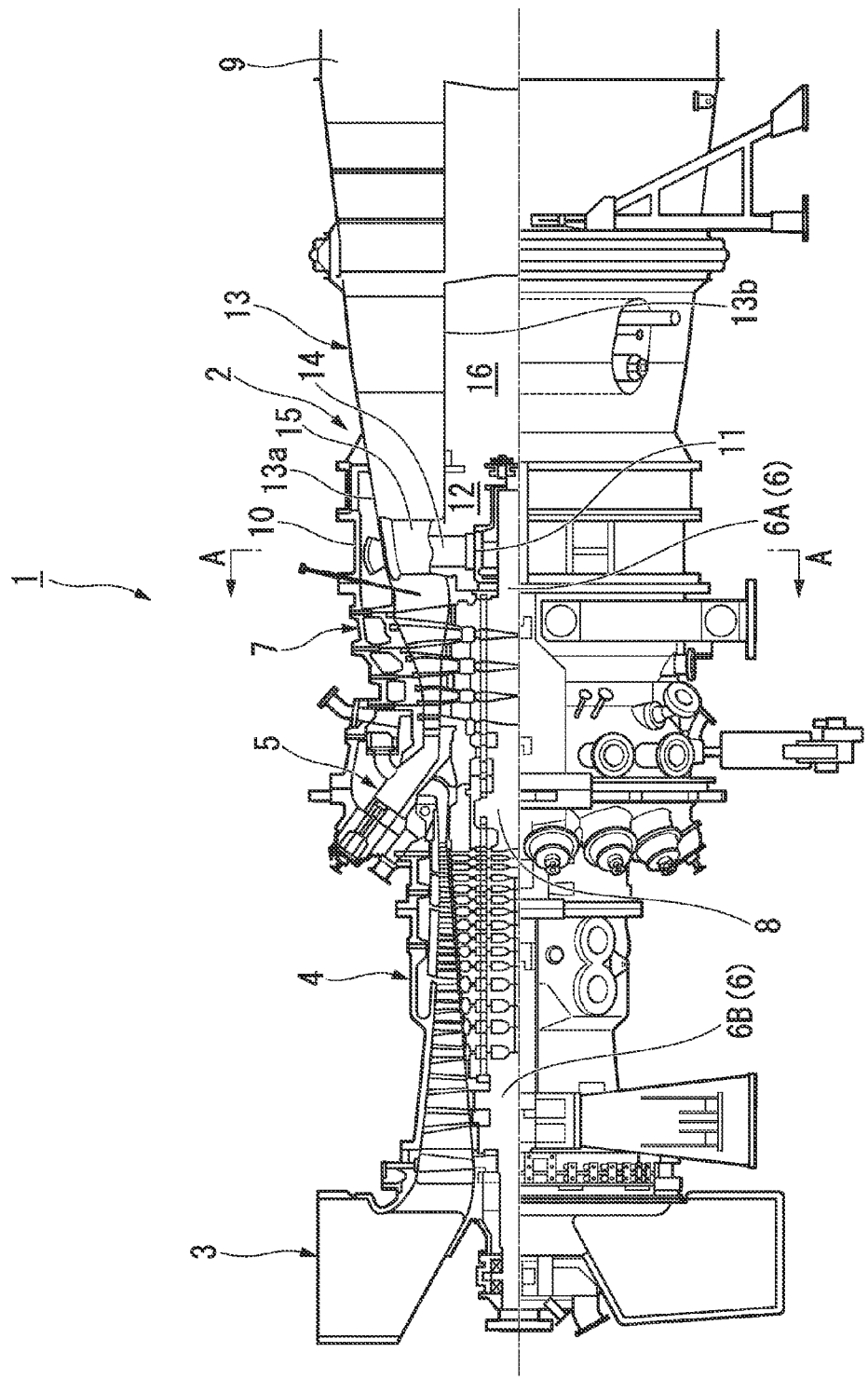
FIG. 1 is a half-cross-sectional view showing the configuration of a gas turbine according to a first embodiment of the present invention.

As shown in FIG. 1, in a gas turbine 1, a disc axis adjusting mechanism of a first embodiment controls a cooling mechanism provided in a gas turbine exhaust section 2 including an exhaust gas diffuser 13, to thereby adjust a disc axis.

The gas turbine 1 is generally configured to include a compressor 4 that compresses air introduced in an Intake facility 3 to obtain compressed air for combustion, a combustor 5 that combusts the compressed air from the compressor 4 together with fuel to generate a high-temperature high-pressure combustion gas, and a turbine 7 that obtains the rotative power of a rotor 6 (6A and 6B) with the combustion gas from the combustor 5.

In addition, although the turbine 7 may be uniaxial or biaxial, a case where the turbine 7 is uniaxial will be described below as an example in the present embodiment.

The rotor 6A of the turbine 7 is coupled to the rotor 6B of the compressor 4 via an intermediate shaft 8, converts fluid energy of the combustion gas from the combustor 5 into rotational energy, transmits this rotational energy to the rotor 6B of the compressor 4 to drive the compressor 4, and makes a generator (not shown) coupled to the rotor 6B of the compressor 4 generate electricity. The combustion gas (exhaust gas) exhausted from the turbine 7 is released to the atmospheric air via a chimney (not shown) through the gas turbine exhaust section 2 and an exhaust duct 9.

Figure 2:
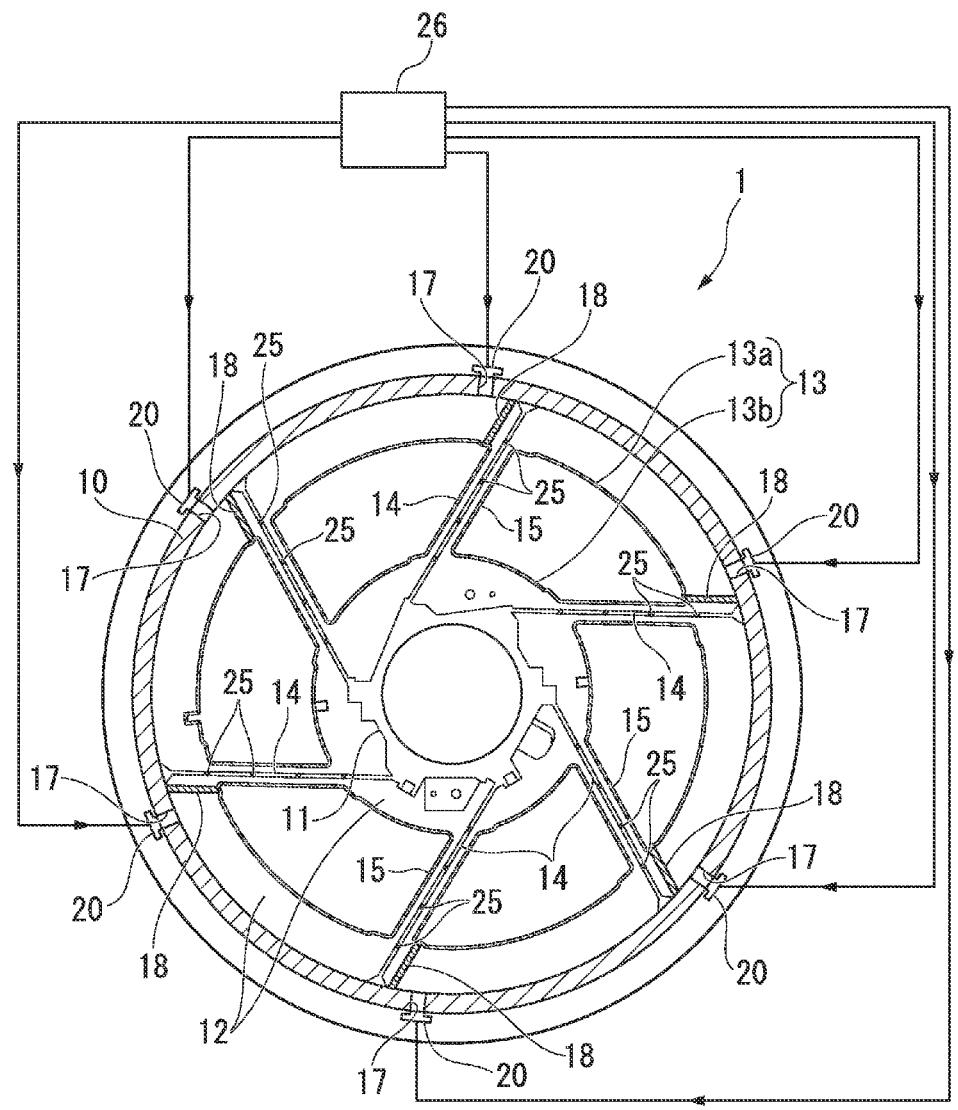
FIG. 2 is a cross-sectional view taken along line A-A shown in FIG. 1.

The gas turbine exhaust section 2, as also shown in FIG. 2, includes exhaust cavities 12 defined by a cylindrical casing wall 10 and a bearing case 11 which are connected to a downstream side of the turbine 7, the exhaust gas diffuser 13 having an outer diffuser 13*a* and an inner diffuser 13*b* provided between the casing wall 10 and the bearing case 11, and being connected to a combustion gas outlet of the turbine 7 so as to recover the static pressure of the combustion gas from the turbine 7, struts 14 that pass through the exhaust gas diffuser 13 to couple the casing wall 10 and the bearing case 11, and strut covers 15 that couple the outer diffuser 13*a* and the inner diffuser 13*b* and cover the struts 14.

The casing wall 10 is divided into a plurality of pieces so as to correspond to a plurality of stages of turbine vanes, struts 14, or the like in an axial direction. Six struts 14 are provided at regular intervals in a circumferential direction and in a tangential direction of the bearing case 11. In addition, the number of the struts 14 is not limited to six.

In the present embodiment, air introduction holes 17 that allow the interior and exterior of the casing wall 10 to communicate with each other (an exhaust tunnel 16 and a casing exterior (substantially atmospheric pressure within an enclosure (not shown))) are provided at positions close to coupling portions of the respective struts 14 in the casing wall 10. That is, air introduced from the air introduction holes 17 flows through spaces (hereinafter, cooling flow passages R) between the struts 14 and the strut covers 15, and is sent into the exhaust cavities 12. Here, the positions of the air introduction holes 17 in the casing wall 10 are positions that approach counterclockwise sides of the struts 14 in the circumferential direction toward the sheet plane of FIG. 2.

Figure 3:
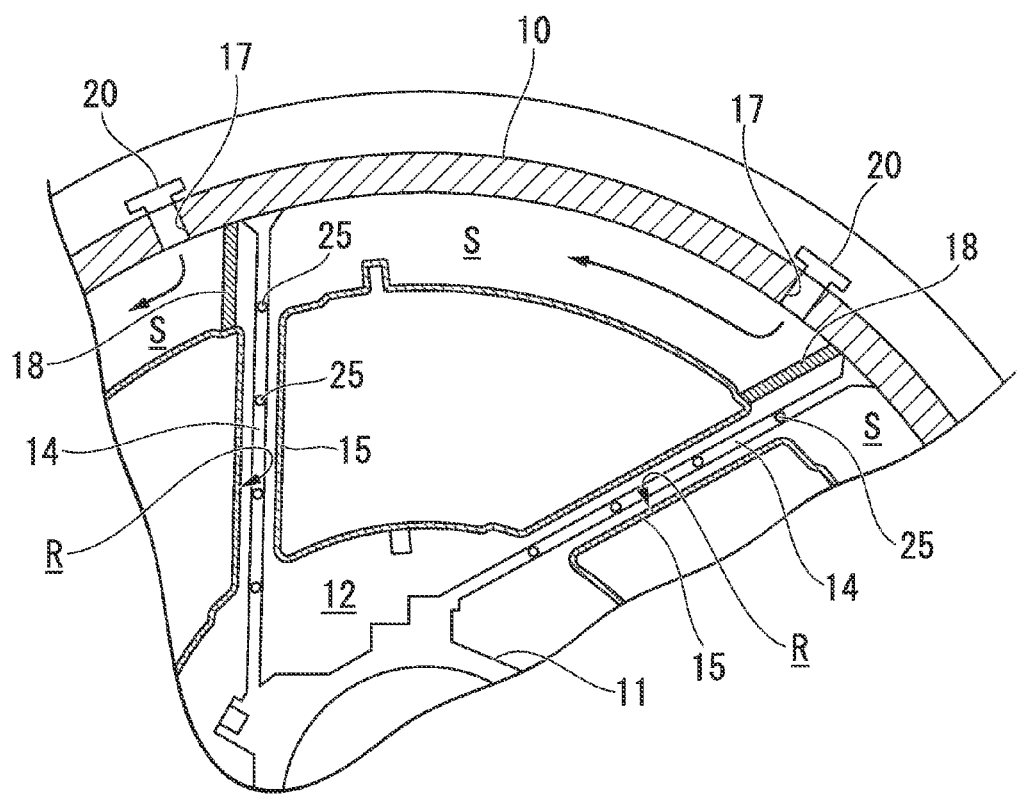
FIG. 3 is an enlarged view of a cooling flow passage shown in FIG. 2.

The air introduced from an air introduction hole 17 is sucked into a cooling flow passage R between a strut 14 and a strut cover 15 by the differential pressure between the air introduction hole 17 under a substantially atmospheric pressure, and a bell mouth part of the intake facility 3 under a negative pressure (refer to FIG. 3).

Additionally, in the present embodiment, partition plates 18 that demarcate in the circumferential direction are provided at six places between the strut covers 15 and an inner peripheral surface of the casing wall 10 so as to correspond to each of the struts 14. Each partition plate 18 is arranged between a strut 14 and an air introduction hole 17 close to the strut 14 on the counterclockwise side of the strut 14 in the circumferential direction toward the sheet plane in FIG. 2. Accordingly, air supplied from an air introduction hole 17 at a predetermined position, as shown in FIG. 3, passes through a predetermined flow passage demarcated by the partition plates 18, that is, a space S between a strut cover 15 and the casing wall 10, and a cooling flow passage R between a strut 14 and the strut cover 15, and flows into an exhaust cavity 12.

Additionally, flow rate adjusting valves 20 (flow rate adjustors) are provided at positions outside the casing wall 10 in the air introduction holes 17. Each flow rate adjusting valve 20, as shown in FIG. 4A, includes a fixing flange 21 provided with a collar portion 21*b* that has an opening hole 21*a* with the same diameter as the air introduction hole 17, a replaceable flange 22 that is detachably provided with bolts or the like so as to overlap the fixing flange 21, and has an opening hole 22*a*, and an opening and closing plate 23 that can adjust the opening hole 22*a* of the replaceable flange 22 to a suitable opening degree (refer to FIG. 6).

Figure 5A:
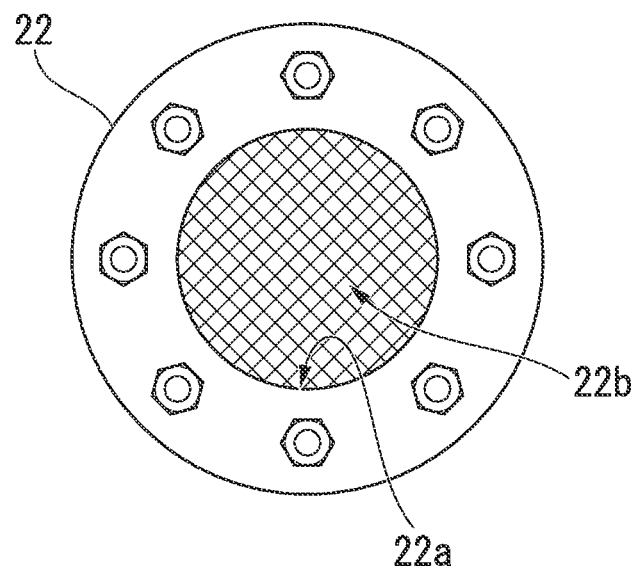
FIG. 5A is a plan view of a replaceable flange of the flow rate adjusting valve.
Figure 5B:
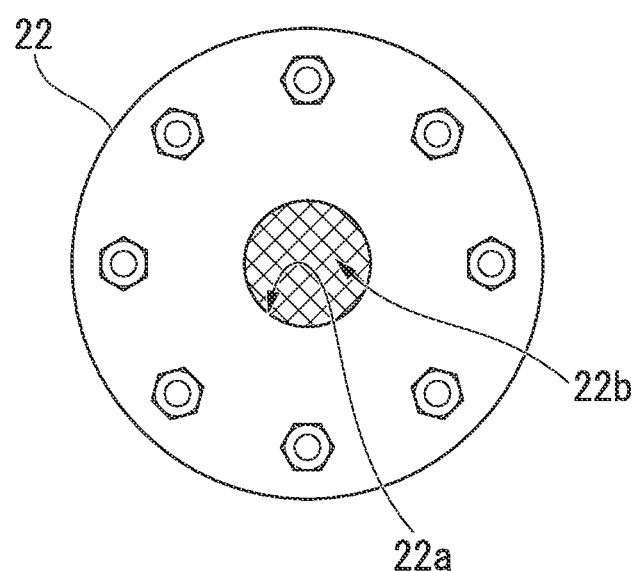
FIG. 5B is a plan view showing a modification example of the replaceable flange of the flow rate adjusting valve.

The replaceable flange 22 has a mesh material 22*b* provided in an opening surface of the opening hole 22*a*, and a replaceable flange in which the hole diameter of the opening hole 22*a* is different can be appropriately detached from or attached to the fixing flange 21. That is, the opening hole 22*a* of the replaceable flange 22 may have the same diameter as the opening hole 21*a* of the fixing flange 21 as shown in FIGS. 4A and 5A, or may be smaller than the opening hole 21*a* of the fixing flange 21 as shown in FIGS. 4B and 5B. Since the replaceable flange 22 is provided outside the casing wall 10, it is possible to replace the replaceable flange 22 with another replaceable flange having a suitable hole diameter even during the operation of the gas turbine 1.

Figure 6:
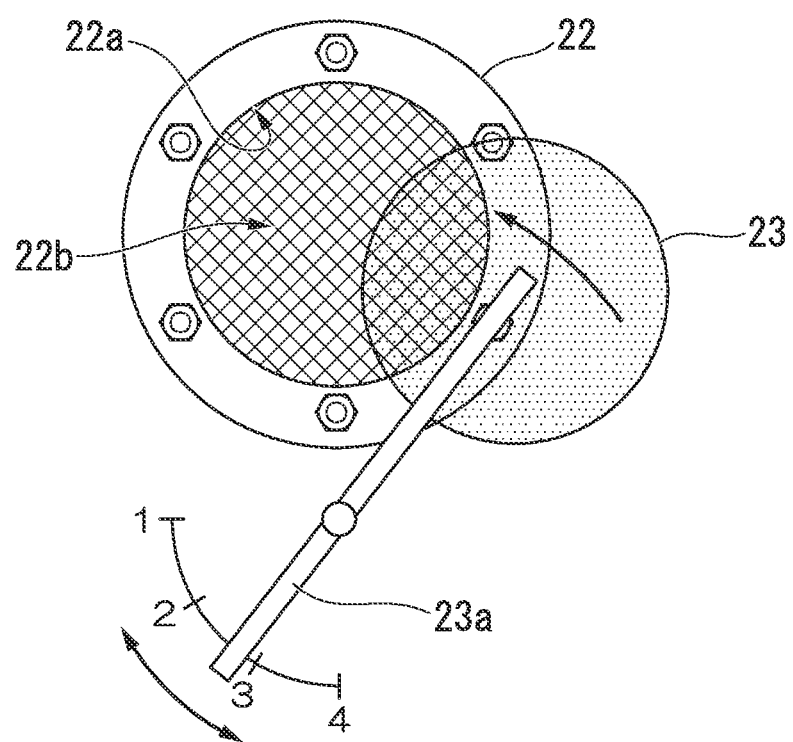
FIG. 6 is a plan view for describing an opened/closed state of the flow rate adjusting valve.

As shown in FIG. 6, the opening and closing plate 23 is slidably provided along the opening surface of the replaceable flange 22, and is configured so that the opening area of the opening hole 22*a* of the replaceable flange 22 can be adjusted by gradually switching an operating part 23*a* on the basis of an instruction value obtained by a flow rate adjusting control unit 26 to be described below.

As shown in FIG. 2, the above-described flow rate adjusting means includes temperature sensors 25 (first sensor units), such as thermocouples, which are provided at each strut 14, and detect the temperature of the strut 14 that is a parameter corresponding to the thermal elongation of the strut 14, and the flow rate adjusting control unit 26 that adjusts the flow rate of air flowing through the air introduction hole 17 on the basis of detection values (temperature) detected by the temperature sensors 25.

A plurality of (four) temperature sensors 25 are provided at regular intervals along a length direction (an extending direction of the casing wall 10 and the bearing case 11 in the strut 14) of the strut 14. In addition, the number of temperature sensors 25 per strut 14 can be appropriately set, and in the present embodiment, four temperature sensors 25 are provided with respect to each strut 14. However, the present invention is not limited to this, and it is only necessary to provide each strut 14 with at least one temperature sensor 25.

The flow rate adjusting control unit 26 shown in FIG. 2 calculates the thermal elongation amount of the respective struts 14 on the basis of measured values obtained by the respective temperature sensors 25, and opens and closes the plurality of flow rate adjusting valves 20.

Here, a method of adjusting the amount of introduction of the air supplied from the air introduction holes 17, using the above-described flow rate adjusting means, will be described with reference to the drawings.

Figure 7:
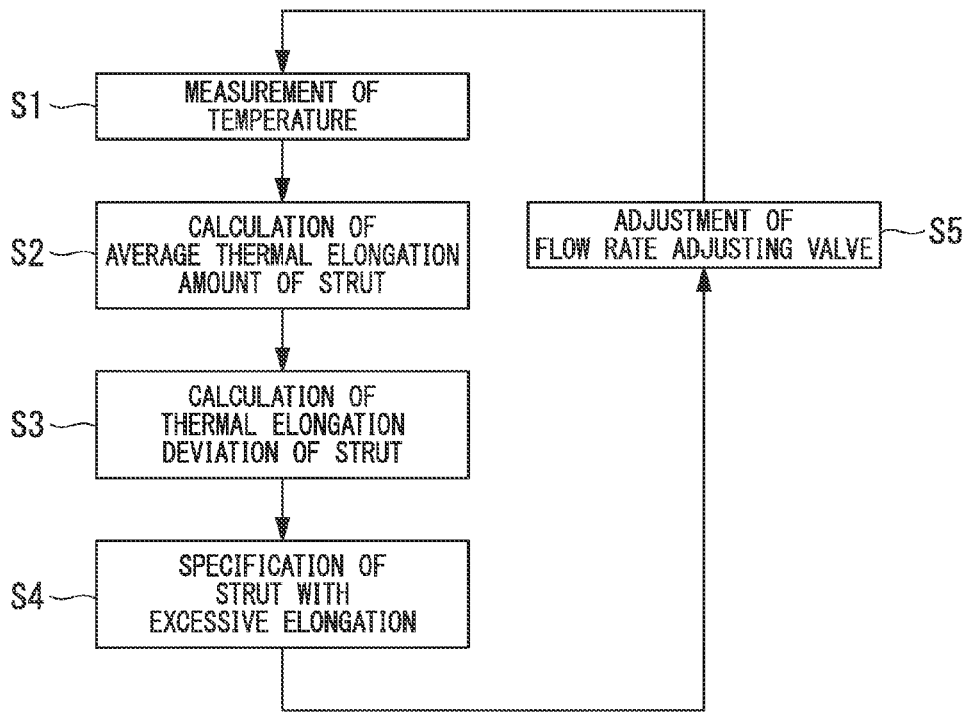
FIG. 7 is a flow chart showing the cooling operation of the first embodiment.

As shown in FIGS. 2 and 7, in Step S1, the metal temperatures of each strut 14 are measured by the temperature sensors 25 provided in the strut 14. Then, in the flow rate adjusting control unit 26, the average thermal elongation amount of each strut 14 is calculated on the basis of the detected temperatures (Step S2). That is, the thermal elongation amount is calculated from an average value of detected temperatures of the four temperature sensors 25 provided in the length direction of the strut 14.

Here, the thermal elongation of the strut 14 brings about the displacement to the bearing case 11 supported by the strut 14, and a deviation is caused in the axis of the rotor 6.

Next, in Step S3, the thermal elongation deviations of the plurality of (six) struts 14 are calculated, and a strut 14 having a greater thermal elongation amount among these struts 14 is specified (Step S4). Then, in the present embodiment, an air volume required for the strut 14 specified from the thermal elongation amount of the strut 14 specified in Step S4 is calculated, and the flow rate of a flow rate adjusting valve 20 corresponding to the specified strut 14 is manually adjusted (Step S5).

Accordingly, since the air of which the flow rate is adjusted by the flow rate adjusting valve 20 flows into a cooling flow passage R corresponding to the specified strut 14 (a space between the strut 14 and the strut cover 15), the specified strut 14 is cooled, and the thermal elongation amount thereof is reduced. Therefore, the displacement of the bearing case 11 can be made small, and the deviation of the axis of the rotor 6 can be corrected.

Here, the measurement using the temperature sensors 25 in Step S1 is performed in real time, and the thermal elongation amount of the strut 14 is also calculated in the state after the flow rate adjustment using the flow rate adjusting valve 20. Therefore, the operation flow of the above-described Steps S1 to S5 is brought into a cycling state, and the axis of the rotor 6 is continuously monitored.

Next, the operation of the disc axis adjusting mechanism in a gas turbine will be more specifically described with reference to the drawings.

As shown in FIG. 3, in the disc axis adjusting mechanism of the present embodiment, the temperature of the strut 14 can be lowered by making the air outside the casing wall 10 flow between the strut 14 and the strut cover 15 from each of the plurality of air introduction holes 17 provided in the casing wall 10.

Also, the flow rate of air flowing through the air introduction hole 17 can be changed by detecting parameters corresponding to the thermal elongation of the strut 14, using the temperature sensors 25, and adjusting the flow rate adjusting valve 20 as shown in FIG. 7 on the basis of the detection values.

In this way, since the thermal elongation amount of the strut 14 can be monitored and the thermal elongation amounts of the plurality of struts 14 can be adjusted through cooling, the deviation of the axis of the rotor 6 supported by the struts 14 via the bearing case 11 can be suppressed, and the deviation of clearance between each turbine blade supported by the rotor 6 and the casing wall 10 can also be suppressed.

Additionally, since the parameters corresponding to the thermal elongation of the struts 14 can be monitored in real time by the temperature sensors 25, it is possible to continue an operation flow that adjusts the flow rate of air flowing through the air introduction holes 17 on the basis of the above-described calculation. Therefore, the thermal elongation amounts of the plurality of struts 14 can be equalized by continuing the operation flow, and the operation of the gas turbine 1 can be continuously stabilized.

Moreover, since the temperature sensors 25 are thermocouples, and a plurality of temperature sensors are provided along the length direction of the strut 14, temperatures in a plurality of places in the length direction of the strut 14 can be detected. Thus, variations in the temperatures in the length direction of the strut 14 become small and are equalized. Accordingly, the accuracy of the detection values can be enhanced, and the correction accuracy of the deviation of the axis of the rotor 6 can be improved.

Moreover, in the disc axis adjusting mechanism of the present embodiment, a region demarcated by the partition plate 18 corresponding to each strut 14 is formed, and the air introduction hole 17 is arranged in the casing wall 10 within the region, so that the air introduction hole 17 that individually corresponds to the strut 14 can be provided. In this case, the flow rate of air flowing through the cooling flow passage R between the strut 14 and the strut cover 15 can be stabilized, and the correction accuracy of the thermal elongation amount of the strut 14 based on the detection values of the temperature sensors 25 can be enhanced. Additionally, since the flow rate adjusting valve 20 that corresponds to each strut 14 can be adjusted, there is an advantage that it is also possible to simultaneously cool the plurality of struts 14, and it is possible to handle the thermal elongations of all the struts.

Additionally, since the present embodiment provides a structure in which the opening and closing operation of the flow rate adjusting valve 20 is performed by the manual operation of the opening and closing plate 23, complicated functions, such as automatic adjustment, are unnecessary, an operator can perform a flow rate adjustment during operation, and can adjust the deviation of the axis of the rotor 6. That is, since it is not necessary to depend on a complicated adjusting mechanism, costs can be reduced.

In the disc axis adjusting mechanism in a gas turbine according to the above-described first embodiment, the flow rate of air flowing through the air introduction hole 17 can be changed by detecting parameters corresponding to the thermal elongation of the strut 14, using the temperature sensors 25, and adjusting the flow rate adjusting valve 20 on the basis of the detection values, and thereby, the deviation of the axis of the rotor 6 can be suppressed.

Moreover, the effect that the axis of the rotor 6 can be continuously monitored is exhibited.

Next, other embodiments and modification examples of the disc axis adjusting mechanism in a gas turbine of the present invention will be described with reference the accompanying drawings. Here, members or portions that are identical or similar to those of the above-described first embodiment will be designated by the same reference numerals, and the description thereof will be omitted, and a configuration different from that of the first embodiment will be described.

Modification Example

Although the above-described first embodiment is configured so that the opening and closing plate 23 (refer to FIG. 6) of the flow rate adjusting valve 20 is manually opened and closed, the present modification example may be configured so that the opening and closing operation of the opening and closing plate 23 of the flow rate adjusting valve 20 is automatically controlled on the basis of a command of the flow rate adjusting control unit 26 shown in FIG. 2.

Figure 8:
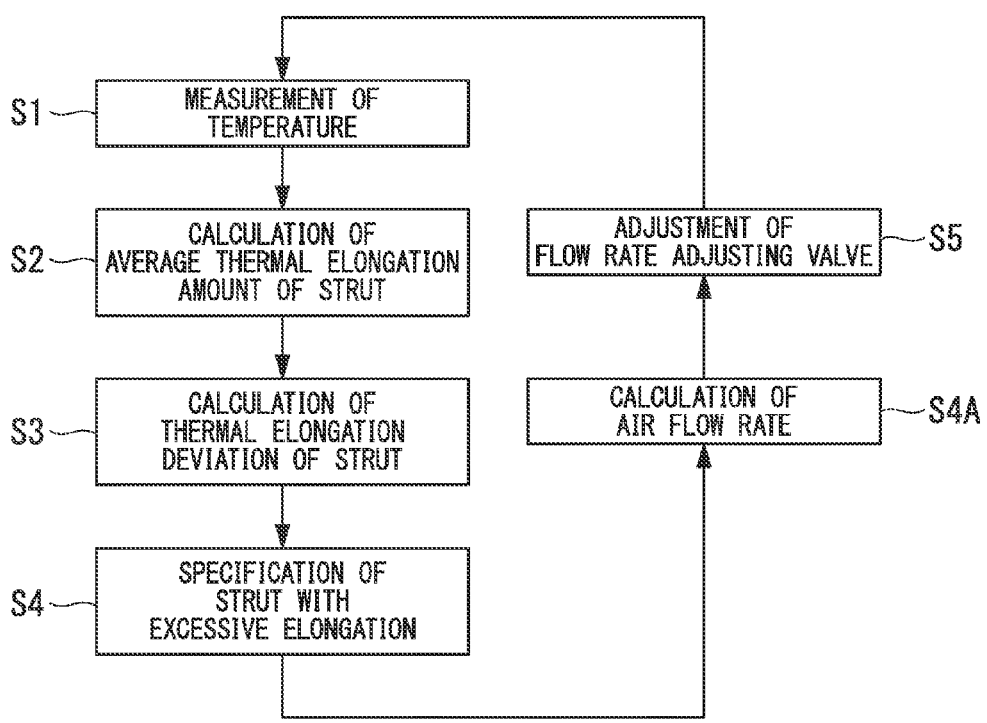
FIG. 8 is a flow chart showing a cooling operation according to the modification example of the first embodiment.

That is, as shown in FIG. 8, the amount (opening degree) of opening and closing of the opening and closing plate 23 corresponding to the specified strut 14, that is, the flow rate of air, is calculated on the basis of the thermal elongation amount of the strut 14 specified in Step S4, and the deviation values of the plurality of struts 14 (Step S4A). Then, in Step S5, a predetermined flow rate adjusting valve 20 is adjusted on the basis of the amount of opening and closing obtained in Step S4A.

Second Embodiment

Figure 9:
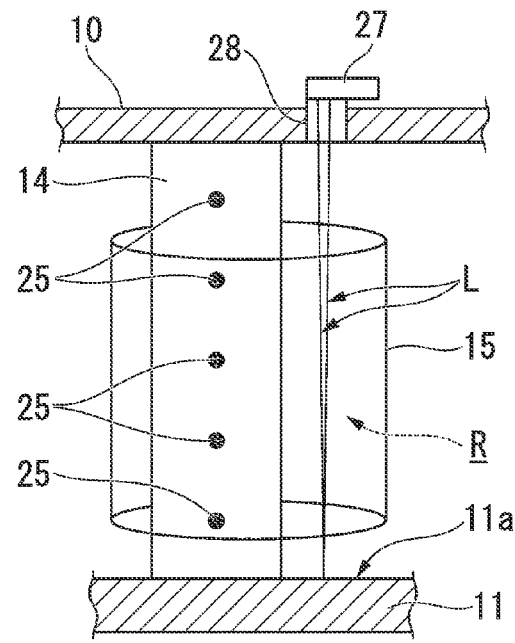
FIG. 9 is a side view schematically showing a disc axis adjusting mechanism of a second embodiment.
Figure 10:
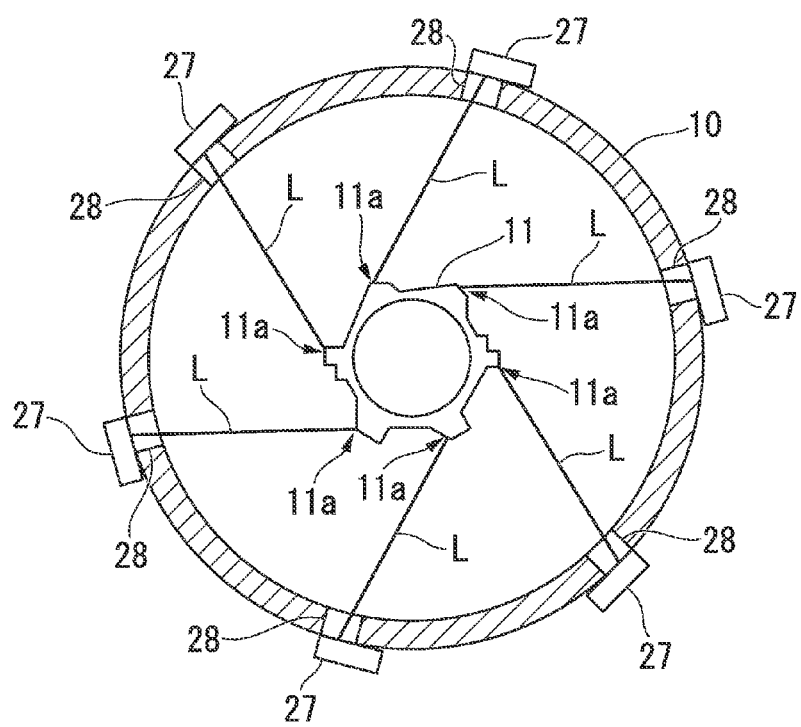
FIG. 10 is a cross-sectional view of the disc axis adjusting mechanism according to the second embodiment.

Next, as shown in FIGS. 9 and 10, a disc axis adjusting mechanism in a gas turbine according to a second embodiment has a configuration in which a laser displacement gauge 27 is provided as the first sensor unit in addition to the temperature sensors 25 (FIG. 3) provided in each strut 14 in the above-described first embodiment. The laser displacement gauge 27 is provided to detect a parameter corresponding to the thermal elongation of the strut 14, similar to the above-described temperature sensors 25, is provided outside the casing wall 10, and causes a laser beam L to pass through a region inside the strut cover 15 in which the strut 14 is interposed, to measure the amount of displacement to a predetermined portion of an outer peripheral portion 11a of the bearing case 11.

A transmission portion 28 formed from glass or the like is provided in the casing wall 10 located on an extension line of the space (cooling flow passage R) between the strut 14 and the strut cover 15, and the laser displacement gauge 27 is arranged on an outer peripheral side of the transmission portion 28 so that a laser beam L to be emitted or received passes through the transmission portion 28. This laser beam L is radiated substantially along the length direction of the strut 14 at a position close to the strut 14 within the strut cover 15.

Figure 11:
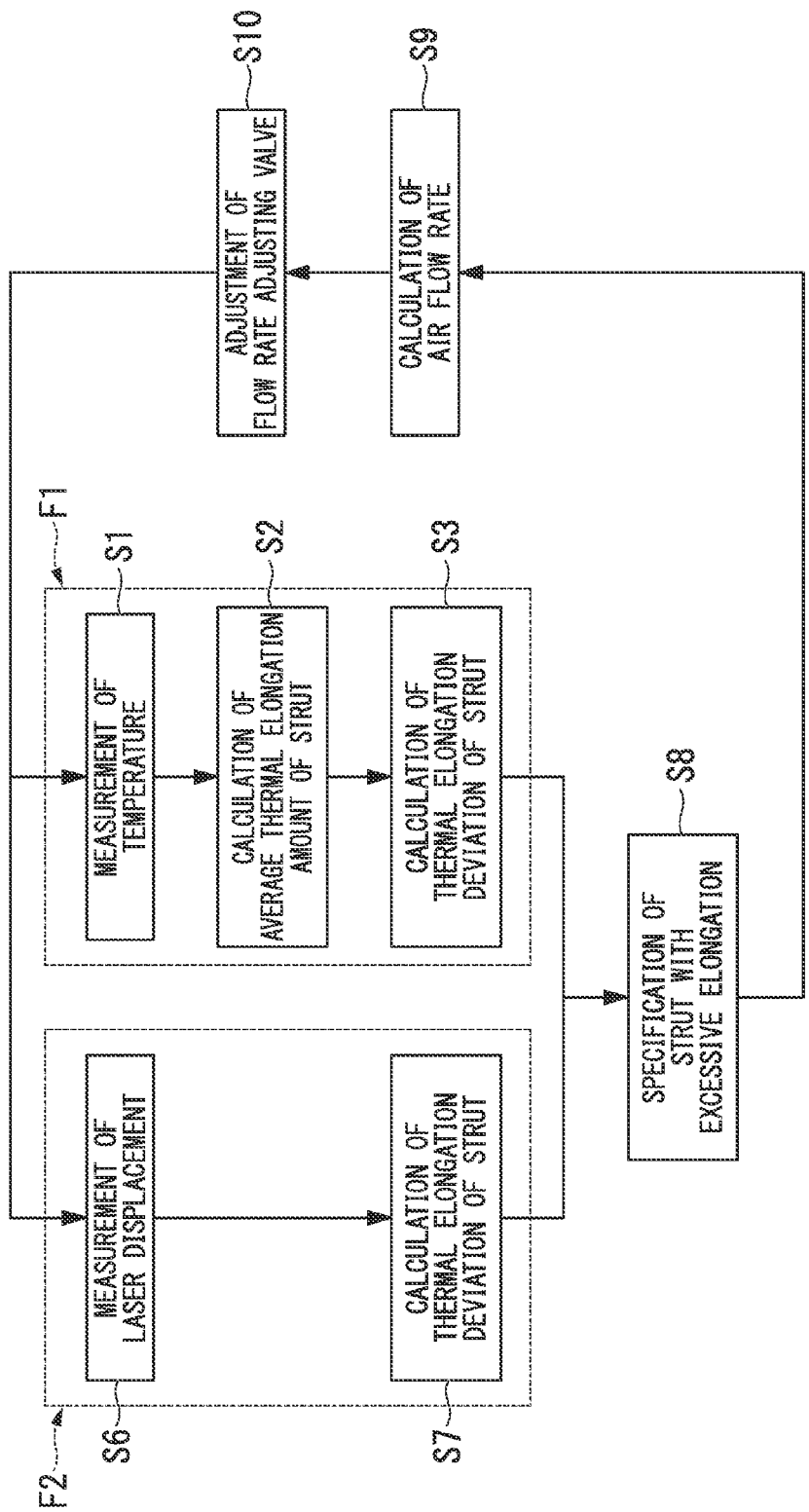
FIG. 11 is a flow chart showing the cooling operation of the second embodiment.

In the flow rate adjusting control unit 26 shown in FIG. 2, the distance between the casing wall 10 and the bearing case 11 is determined as shown in FIG. 11. Thus, if the amount of displacement of the casing wall 10 (the amount of displacement from the casing wall 10 to the outer peripheral portion 11a of the bearing case 11) is measured by the laser displacement gauge 27 in Step S6, the amount of displacement is converted to the thermal elongation amount of the strut 14 in Step S7, and the respective thermal elongation deviations of the plurality of struts 14 are calculated.

Steps S6 and S7 correspond to flows parallel to Steps S1 to S3 (as described above) in the temperature sensors 25, and a strut 14 having a greater thermal elongation amount among the struts 14 is specified in Step S8, on the basis of respective flows F1 and F2 (a first calculation flow F1 obtained by the temperature sensors 25 and a second calculation flow F2 obtained by the laser displacement gauge 27). Then, the flow rate of air is calculated (Step S9), and a predetermined flow rate adjusting valve 20 is adjusted in Step S10 on the basis of the flow rate obtained in Step S9.

In the second embodiment, as shown in FIG. 11, the amount of displacement of the laser beam L passing through the space between the strut 14 and the strut cover 15 from the position close to the strut 14 to the portion close to the position of the bearing case 11 where the strut 14 is fixed can be measured by the laser displacement gauge 27. That is, since this amount of displacement corresponds to the dimension of the strut 14 in the length direction, the flow rate of air flowing through the air introduction hole 17 can be changed by calculating the thermal elongation amount of the strut 14 from this displacement amount and adjusting the flow rate adjusting valve 20.

Third Embodiment

Figure 12:
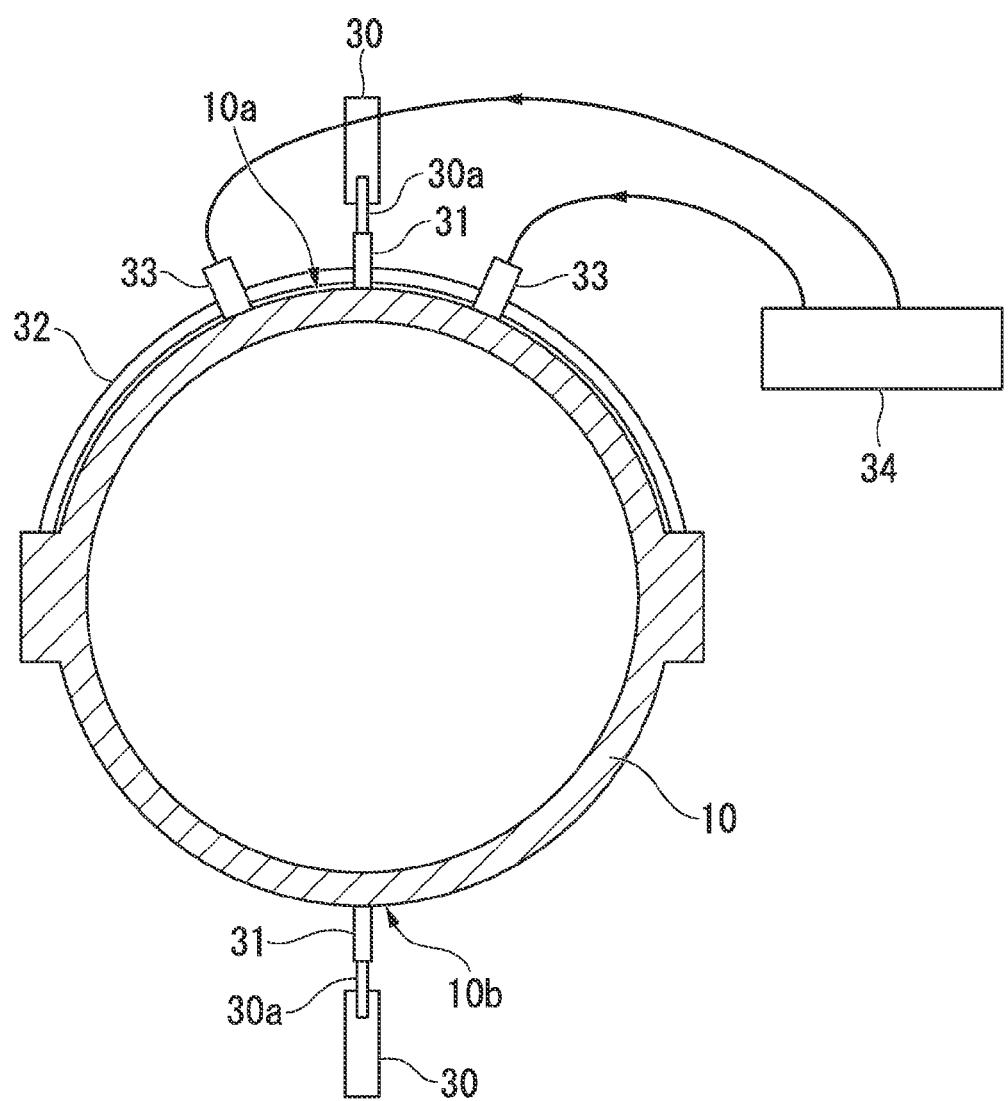
FIG. 12 is a cross-sectional view schematically showing a disc axis adjusting mechanism of a third embodiment.

As shown in FIG. 12, a disc axis adjusting mechanism in a gas turbine according to a third embodiment is configured so that displacement sensors 30 that measure the displacement of the casing wall 10 through contact are provided at the positions of an upper end 10a and a lower end 10b outside the casing wall 10, and air is blown against an outer peripheral surface of the casing wall 10 on the basis of the displacement of the casing wall 10 detected by the displacement sensors 30.

Specifically, a measuring projection 31 is provided at each measurement point (here, the upper end 10a or the lower end 10b) of the outer peripheral surface of the casing wall 10, and a detector 30a of the displacement sensor 30 is brought into contact with the measuring projection 31. An upper half portion of the outer peripheral surface of the casing wall 10 is covered with a heat insulating material 32, and an air introduction port 33 is provided through the heat insulating material 32 from the outside. The air introduction port 33 is connected to, for example, a small-sized compressed air apparatus 34 (compressor). Accordingly, since air blown off from the air introduction port 33 is directly blown against the outer peripheral surface of the upper half portion of the casing wall 10 to cool the upper half portion, and the air is also supplied into the heat insulating material 32, the temperature of the upper half portion can be lowered and the eccentricity of the casing wall 10 itself can be suppressed. This can make the clearance deviation of the casing wall 10 from each turbine blade (rotor 6) small.

Figure 13:
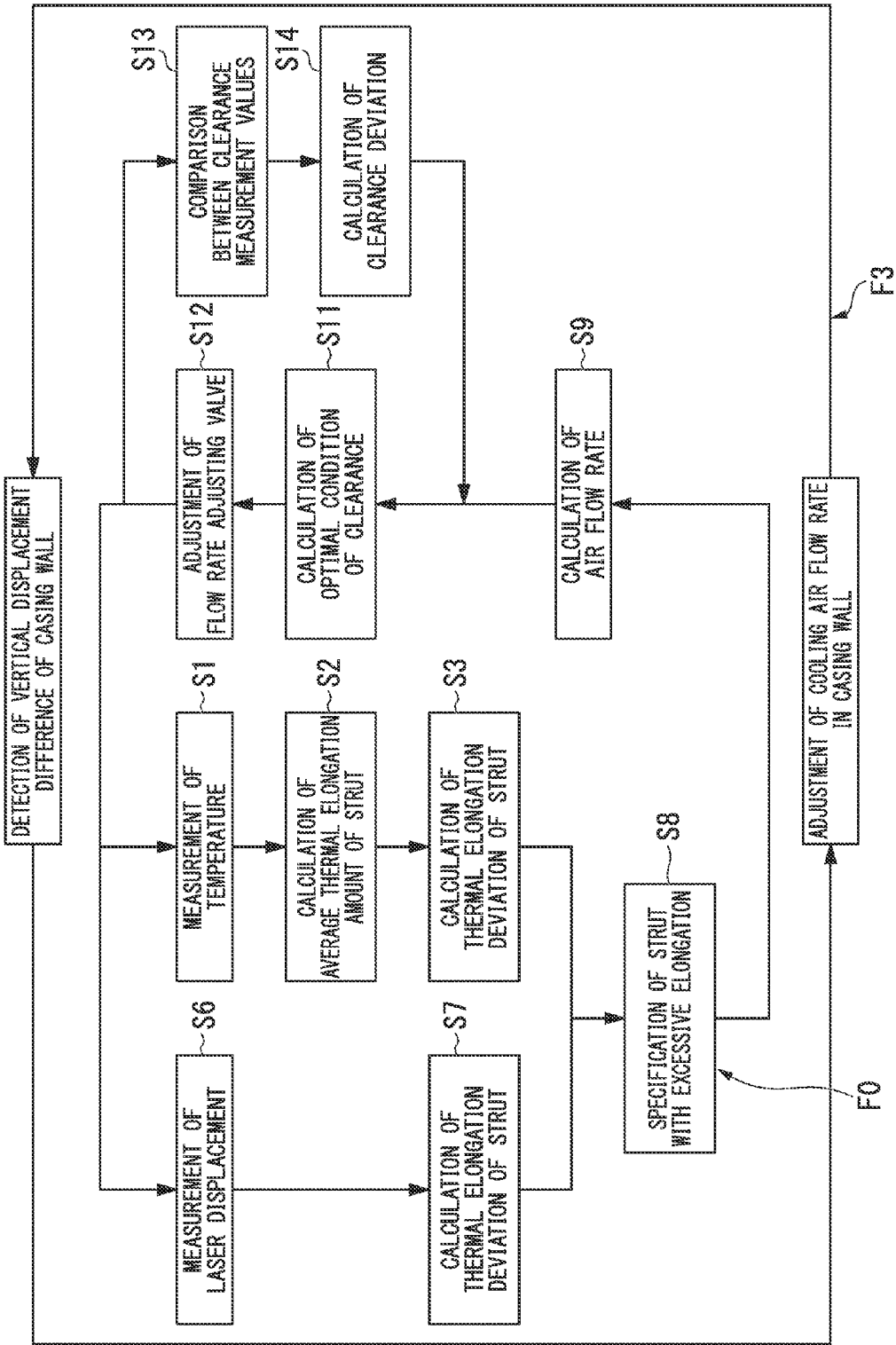
FIG. 13 is a flow chart showing the cooling operation of a third embodiment.

Additionally, FIG. 13 shows an operation flow according to the third embodiment, which is based on the operation flow of the above-described second embodiment.

As shown in FIG. 13, a cooling flow F3 for making the displacement of the casing wall 10 detected by the displacement sensors 30 small is an operation flow that is separate from a flow rate adjustment flow F0 based on the temperature sensors 25 or the laser displacement gauge 27.

In addition, when the casing wall 10 itself to which the strut 14 is attached has been elliptically deformed, the deformation may cause an error, which leads to the eccentricity of the rotor 6. That is, since the above clearance can also be corrected by the flow rate adjustment using the flow rate adjusting valve 20, the displacement detected by the displacement sensors 30 also serves as an adjustment condition of the flow rate adjusting valve 20.

Specifically, in the flow rate adjustment flow F0 of FIG. 13, the flow rate of air is calculated in Step S9 based on the parameters (Steps S3 and S7) corresponding to the thermal elongation of the strut 14 detected by the temperature sensors 25 and the laser displacement gauge 27 that are shown in FIG. 9, and then, the flow rate adjusting valve 20 is adjusted in Step S12.

Additionally, after the flow rate adjustment of Step S12, the displacement of the casing wall 10 is again detected by the displacement sensors 30, and the clearances before and after the flow rate adjustment are compared with each other (Step S13), a clearance deviation is further calculated (Step S14), and the flow rate of air calculated in Step S9 Is corrected. Accordingly, the optimal condition of the clearance between the casing wall 10 and each turbine blade (rotor 6) is calculated.

In the third embodiment, the displacement of the casing wall 10 can be corrected by blowing air against the outer peripheral surface of the casing wall 10 on the basis of the displacement of the casing wall 10 detected by the displacement sensors 30, separately from the above-described temperature sensors 25 or laser displacement gauge 27 that detects the parameters corresponding to the thermal elongation of the strut 14.

Also, the flow rate adjusting valve 20 can be adjusted by making the detected displacement of the casing wall 10 correspond to the thermal elongation of the strut 14 detected by the first sensor units, such as the above temperature sensors 25, and the deviation of the axis of the rotor 6 can be adjusted based on the clearance between the casing wall 10 and each turbine blade.

Fourth Embodiment

Next, a fourth embodiment will be described with reference to the accompanying drawings. In the present embodiment, clearance measuring instruments 37 are added to the disc axis adjusting mechanism in a gas turbine 1 of the above-described first embodiment. Referring to FIGS. 1 to 6 of the first embodiment, identical or similar members or portions will be designated by the same reference numerals and the description thereof will be omitted, and a configuration different from that of the first embodiment will be described.

Figure 14:
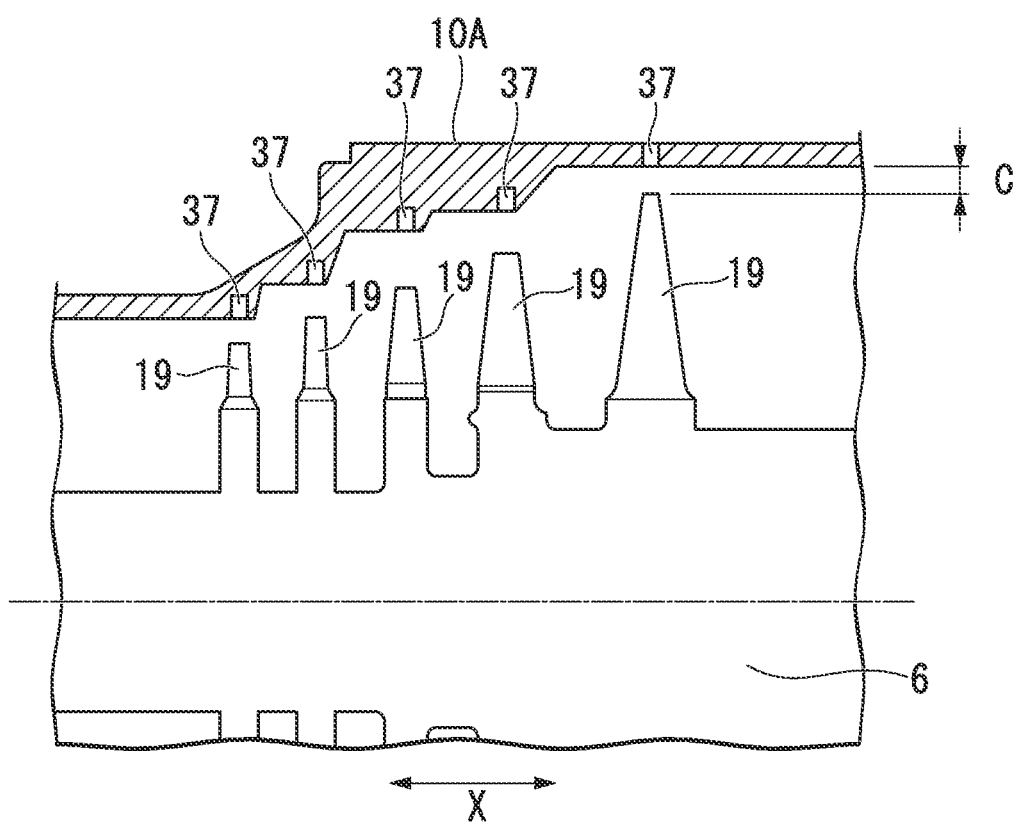
FIG. 14 is a side view schematically showing a disc axis adjusting mechanism of a fourth embodiment.

As shown in FIG. 14, in a disc axis adjusting mechanism in a gas turbine according to the fourth embodiment, the clearance measuring instruments 37 (second sensor units) that detect a clearance C between each turbine blade 19 and a turbine casing 10A in the turbine 7 are provided over a plurality of stages (here, five stages) along a turbine axial direction (the direction of arrow X in FIG. 14) in the turbine casing 10A. In addition, FIG. 14 is a view in which turbine vanes are omitted. As each clearance measuring instrument 37, for example, a capacitance type, an eddy current type, an optical type, or the like that can withstand an atmosphere of 1500° C. is used. The clearance measuring instrument 37 has a detector exposed to an inner peripheral surface side of the turbine casing 10A and is provided at a position radially outside the turbine blade 19. Additionally, although the clearance measuring instruments 37 provided at each respective stage are not particularly shown, the clearance measuring instruments are provided at four points of up, down, right, and left in the circumferential direction.

Here, a method of adjusting the amount of introduction of the air supplied from the air introduction holes 17, using the above-described flow rate adjusting means, will be described with reference to the drawings.

Figure 15:
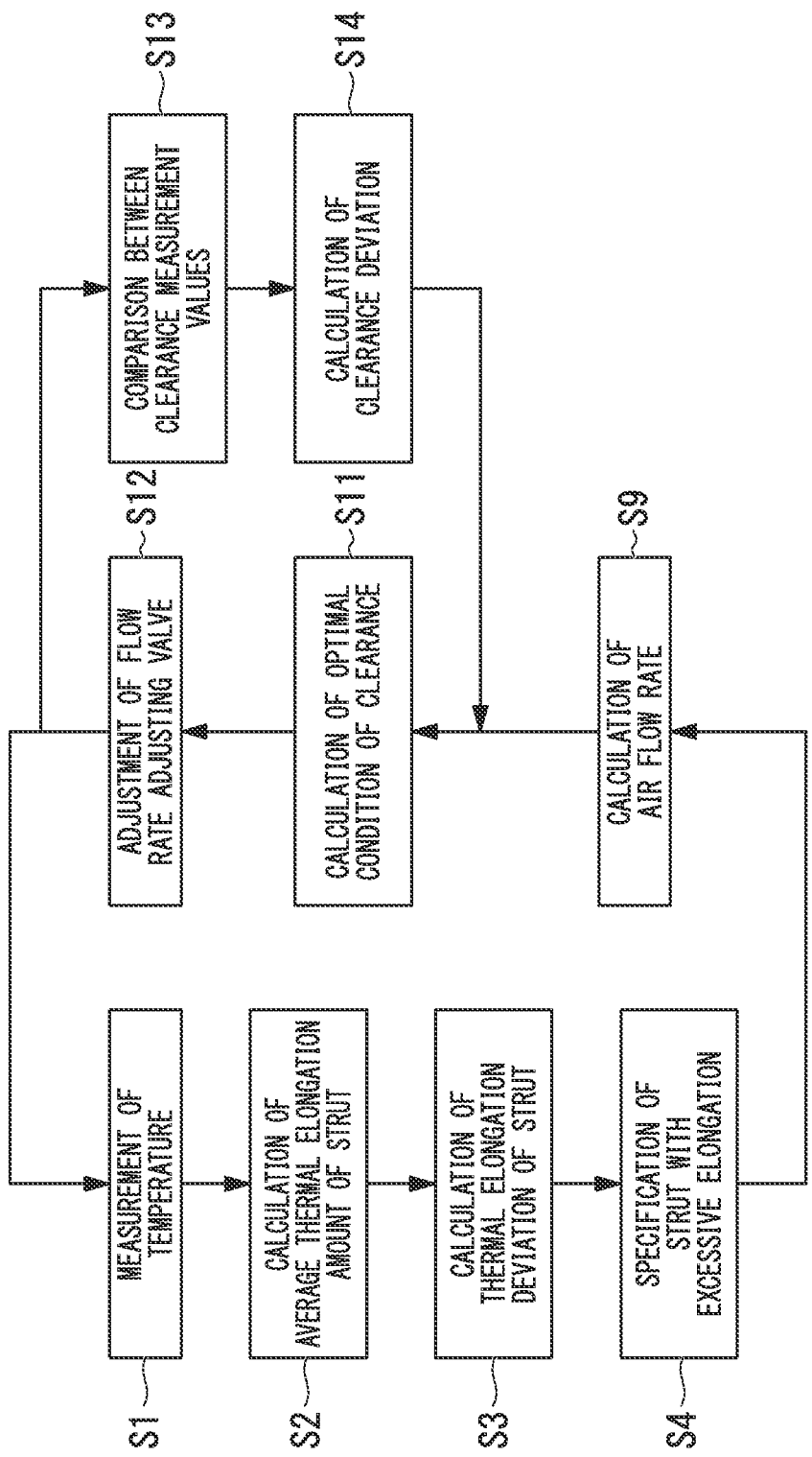
FIG. 15 is a flow chart showing the cooling operation of the fourth embodiment.

As shown in FIGS. 2 and 15, in Step S1, the temperatures of each strut 14 are measured by the temperature sensors 25 provided in the strut 14. Then, in the flow rate adjusting control unit 26, the average thermal elongation amount of each strut 14 is calculated on the basis of the detected temperatures (Step S2). That is, the thermal elongation amount is calculated from an average value of detected temperatures of the four temperature sensors 25 provided in the length direction of the strut 14.

Here, the thermal elongation of the strut 14 brings about the displacement to the bearing case 11 supported by the strut 14, and a deviation is caused in the axis of the rotor 6.

Next, in Step S3, the thermal elongation deviations of the plurality of (six) struts 14 are calculated, and a strut 14 having a greater thermal elongation amount among these struts 14 is specified (Step S4). Then, in the present embodiment, an air volume required for the strut 14 specified from the thermal elongation amount of the strut 14 specified in Step S4 is calculated, and the amount (opening degree) of opening and closing of an opening and closing plate 23 corresponding to the specified strut 14, that is, the flow rate of air is calculated on the basis of the thermal elongation amount of the strut 14 specified in Step S4, and the deviation values of the plurality of struts 14 (Step S9).

Next, the flow rate of air is calculated in Step S9 based on the parameters (Step S4) corresponding to the thermal elongation of the strut 14 detected by the temperature sensors 25, and, in Step S11, is corrected on the basis of the clearance C detected by the clearance measuring instrument 37 and then an optimal condition of the clearance C between the turbine casing 10A and each turbine blade 19 (rotor 6) is calculated. Then, the flow rate adjusting valve 20 is adjusted in Step S12.

Additionally, in a flow, after the flow rate adjustment of Step S12, the clearance C is again measured and the clearances before and after the flow rate adjustment are compared with each other (Step S13), a clearance deviation is further calculated (Step S14), and the flow rate of air calculated in Step S11 is corrected. As a result, the optimal condition of the clearance between the turbine casing 10A and each turbine blade 19 (rotor 6) is calculated.

Accordingly, since the air of which the flow rate is adjusted by the flow rate adjusting valve 20 flows into a cooling flow passage R corresponding to the specified strut 14 (a space between the strut 14 and the strut cover 15), the specified strut 14 is cooled, and the thermal elongation amount thereof is reduced. Therefore, the displacement of the bearing case 11 can be made small, and the deviation of the axis of the rotor 6 can be corrected.

Here, the measurement using the temperature sensors 25 in Step S1 is performed in real time, and the thermal elongation amount of the strut 14 is also calculated in the state after the flow rate adjustment using the flow rate adjusting valve 20. Therefore, the operation flow of the above-described Steps S1 to S12 is brought into a cycling state, and the axis of the rotor 6 is continuously monitored.

Next, the operation of the disc axis adjusting mechanism in a gas turbine will be more specifically described with reference to the drawings.

As shown in FIG. 3, in the disc axis adjusting mechanism of the present embodiment, the temperature of the strut 14 can be lowered by making the air outside the casing wall 10 flow between the strut 14 and the strut cover 15 from each of the plurality of air introduction holes 17 provided in the casing wall 10.

Also, as shown in FIG. 14, the flow rate of air flowing through the air introduction hole 17 can be changed by detecting the clearance C between each turbine blade 19 and the turbine casing 10A in the turbine 7, using the clearance measuring instrument 37, and adjusting the flow rate adjusting valve 20 shown in FIG. 2, on the basis of this detection value. In this case, it is possible to provide a plurality of the clearance measuring instruments 37 in the circumferential direction of the turbine casing 10A, calculate clearance deviations in the circumferential direction from the detection values of the clearance measuring instruments, specify a position having a greater clearance deviation among the clearance measuring instruments 37 provided in the circumferential direction, and make a certain flow rate of air flow individually to the specified portion, thereby performing cooling.

For example, during the operation of the turbine, when a temperature difference is caused in a vertical direction of the turbine casing 10A and a clearance deviation is caused with a so-called "stoop deformation", the clearances can be optimized so that the thermal elongation of a strut 14 arranged on a lower side become large, the air volume of a strut 14 arranged on an upper side can be increased, and the deviation of the axis of the rotor 6 is intentionally brought close to that of an axis portion of the turbine casing 10A.

In this way, since the clearance between each turbine blade and the turbine casing 10A can be monitored and the thermal elongation amounts of the plurality of struts 14 can be adjusted through cooling, the deviation of the axis of the rotor 6 supported by the struts 14 via the bearing case 11 can be suppressed, and the deviation of clearance between each turbine blade 19 supported by the rotor 6 and the turbine casing 10A can also be suppressed.

Additionally, since variations in the detection values become small and are equalized by detecting and monitoring the clearances C, using the plurality of stages of clearance measuring instruments 37, in the turbine axial direction X, the accuracy of the detection values can be enhanced, and the correction accuracy of the deviation of the axis of the rotor 6 can be improved.

Additionally, in the disc axis adjusting mechanism of the present embodiment, as shown in FIG. 2, the flow rate of air flowing through the air introduction hole 17 can be changed by detecting the temperatures of the strut 14, using the temperature sensors 25, calculating the thermal elongation amount from the detected temperatures, and adjusting the flow rate adjusting valve 20. Therefore, since the flow rate adjusting valve 20 can be adjusted on the basis of two parameters of the thermal elongation amount of the strut 14 detected by the temperature sensors 25 and the clearance C detected by the clearance measuring instrument 37 shown in FIG. 14, the axis of the rotor 6 can be optimized while maintaining the clearance C between the rotor 6 (turbine blade 19) and the turbine casing 10A.

In the disc axis adjusting mechanism in a gas turbine according to the above-described present embodiment, the flow rate of air flowing through the air introduction hole 17 can be changed by detecting the clearance C between each the turbine blade 19 and the turbine casing 10A, using the clearance measuring instrument 37, and adjusting the flow rate adjusting valve 20 on the basis of the detection values, and thereby, the deviation of the axis of the rotor 6 can be suppressed.

Moreover, the effect that the axis of the rotor 6 can be continuously monitored is exhibited.

Fifth Embodiment

Figure 16:
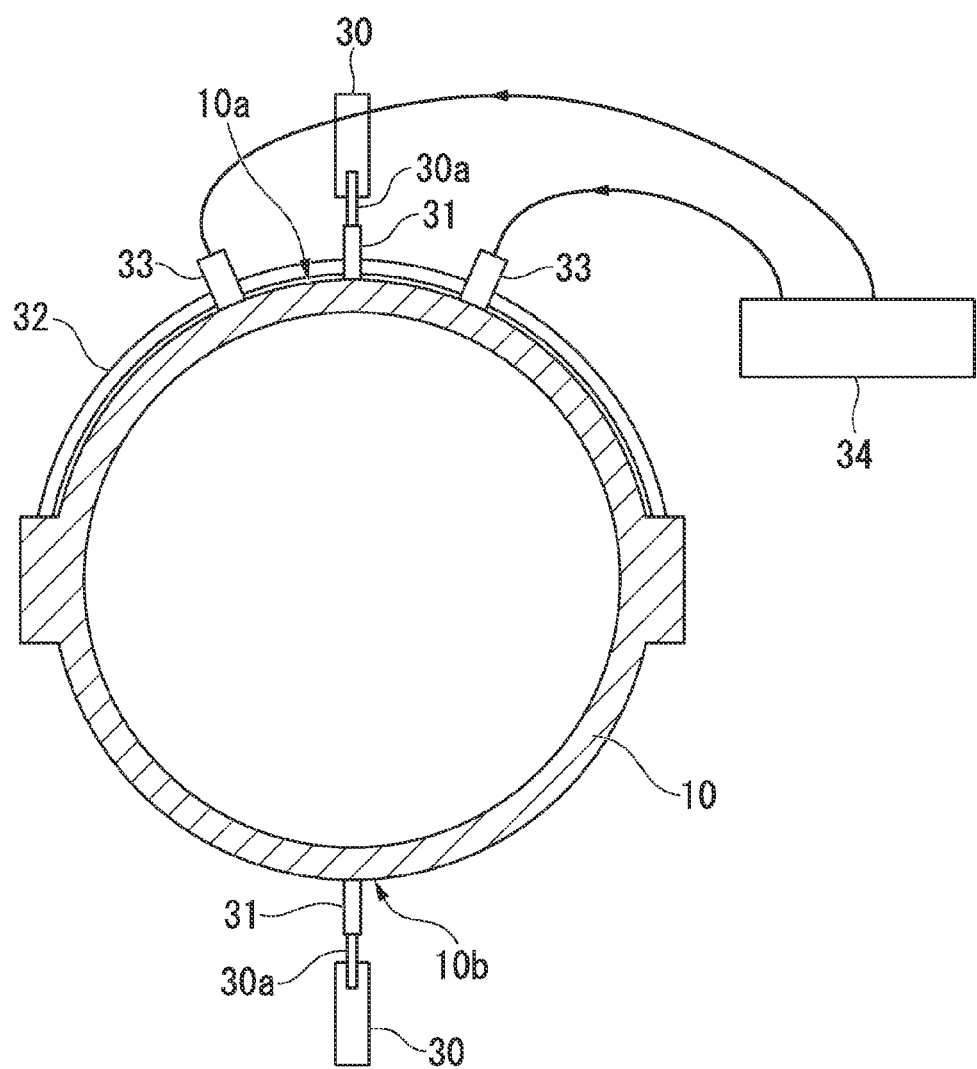
FIG. 16 is a cross-sectional view schematically showing a disc axis adjusting mechanism of a fifth embodiment.

As shown in FIG. 16, a disc axis adjusting mechanism in a gas turbine according to a fifth embodiment is configured so that the displacement sensors 30 that measure the displacement of the casing wall 10 through contact are provided at the positions of the upper end 10a and the lower end 10b outside the casing wall 10, and air is blown against the outer peripheral surface of the casing wall 10 on the basis of the displacement of the casing wall 10 detected by the displacement sensors 30.

Specifically, the measuring projection 31 is provided at each measurement point (here, the upper end 10a or the lower end 10b) of the outer peripheral surface of the casing wall 10, and the detector 30a of the displacement sensor 30 is brought into contact with the measuring projection 31. The upper half portion of the outer peripheral surface of the casing wall 10 is covered with the heat insulating material 32, and the air introduction port 33 is provided through the heat insulating material 32 from the outside. The air introduction port 33 is connected to, for example, the small-sized compressed air apparatus 34 (compressor). Accordingly, since air blown off from the air introduction port 33 is directly blown against the outer peripheral surface of the upper half portion of the casing wall 10 to cool the upper half portion, and the air is also supplied into the heat insulating material 32, the temperature of the upper half portion can be lowered and the eccentricity of the casing wall 10 itself can be suppressed. This can make the clearance deviation of the casing wall 10 from each turbine blade (rotor 6) small.

In the fifth embodiment, the displacement of the casing wall 10 can be corrected by blowing air against the outer peripheral surface of the casing wall 10 on the basis of the displacement of the casing wall 10 detected by the displacement sensors 30, separately from the above-described temperature sensors 25 that detect the clearance C between the turbine blade 19 and the turbine casing 10A.

Also, the flow rate adjusting valve 20 can be adjusted by making the displacement of the turbine casing 10A correspond to the clearance C between the turbine blade 19 and the turbine casing 10A detected by the second sensor units, and the deviation in the axis of the rotor 6 can be adjusted based on the clearance C between the turbine casing 10A and the turbine blade 19.

Although the embodiments of the disc axis adjusting mechanism in a gas turbine according to the present invention have been described above, the present invention is not limited to the above embodiments, and can be appropriately changed without departing from the scope thereof.

For example, in the present embodiment, the temperature measurement of the strut 14 is performed using the temperature sensors 25. However, the temperature measurement of the strut 14 may not be performed, and only the clearance C between the turbine casing 10A and the turbine blade 19 may be performed by the clearance measuring instruments 37.

In addition, the constituent elements in the above-described embodiments can be substituted with well-known constituent elements without departing from the scope of the present invention, and the above-described embodiments may be combined appropriately. For example, in the third embodiment, the disc axis adjusting mechanism in a gas turbine is configured to include the temperature sensors, the laser displacement gauges, and the displacement sensors, but it is also possible to use only the laser displacement gauges and the displacement sensors. Additionally, laser displacement gauges may be added to the fourth and fifth embodiments.

REFERENCE SIGNS LIST

1: GAS TURBINE
2: GAS TURBINE EXHAUST SECTION
6: ROTOR
6A: ROTOR OF TURBINE
6B: ROTOR OF COMPRESSOR
7: TURBINE
9: EXHAUST DUCT
10: CASING WALL
11: BEARING CASE
12: EXHAUST CAVITY
13: EXHAUST GAS DIFFUSER
14: STRUT
15: STRUT COVER
17: AIR INTRODUCTION HOLE
18: PARTITION PLATE
20: FLOW RATE ADJUSTING VALVE (FLOW RATE ADJUSTOR)
21: FIXING FLANGE
22: REPLACEABLE FLANGE
23: OPENING AND CLOSING PLATE
25: TEMPERATURE SENSOR (FIRST SENSOR UNIT)
26: FLOW RATE ADJUSTING CONTROL UNIT
27: LASER DISPLACEMENT GAUGE (FIRST SENSOR UNIT)
28: TRANSMISSION PORTION
30: DISPLACEMENT SENSOR
37: CLEARANCE MEASURING INSTRUMENT (SECOND SENSOR UNIT)
R: COOLING FLOW PASSAGE

The invention claimed is:

1. A disc axis adjusting mechanism in a gas turbine, the gas turbine having an exhaust gas diffuser having an outer diffuser and an inner diffuser provided between a casing wall and a bearing case which are connected to a downstream side of the turbine, a plurality of struts that couple the casing wall and the bearing case through the exhaust gas diffuser and are provided at intervals in a circumferential direction, and strut covers that couple the outer diffuser and the inner diffuser so as to cover the struts, the mechanism comprising:
- a plurality of air introduction holes formed in the casing wall so as to correspond to each of the struts, and allow the interior and exterior of the wall to communicate with each other;
- a first sensor unit configured to detect a parameter corresponding to the thermal elongation of each of the struts; and
- a flow rate adjustor configured to adjust the flow rate of air flowing through each of the air introduction holes on the basis of a detection value detected by the first sensor unit.

2. The disc axis adjusting mechanism in a gas turbine according to claim 1,
wherein the first sensor unit is a temperature sensor that detects the temperature of the strut.

3. The disc axis adjusting mechanism in a gas turbine according to claim 2,
wherein the temperature sensor is a thermocouple, and
a plurality of the temperature sensors are provided along a length direction of the strut.

4. The disc axis adjusting mechanism in a gas turbine according to claim 1,
wherein the first sensor unit is a laser displacement gauge that is provided outside the casing wall, and causes a laser beam to pass through a region inside the strut cover having the strut interposed therein to measure the amount of displacement up to an outer peripheral portion of the bearing case.

5. The disc axis adjusting mechanism in a gas turbine according to claim 1,
wherein a partition plate is provided to demarcate a space between the strut cover and an inner peripheral surface of the casing wall in the circumferential direction, and
one strut is arranged within a region demarcated by the partition plate.

6. The disc axis adjusting mechanism in a gas turbine according to claim 1,
wherein a displacement sensor is provided in the casing wall to measure the displacement of the casing wall, and
air is blown against an outer peripheral surface of the casing wall on the basis of the displacement of the casing wall detected by the displacement sensor.

7. The disc axis adjusting mechanism in a gas turbine according to claim 2,
wherein the first sensor unit is a laser displacement gauge that is provided outside the casing wall, and causes a laser beam to pass through a region inside the strut cover having the strut interposed therein to measure the amount of displacement up to an outer peripheral portion of the bearing case.

8. The disc axis adjusting mechanism in a gas turbine according to claim 3,
wherein the first sensor unit is a laser displacement gauge that is provided outside the casing wall, and causes a laser beam to pass through a region inside the strut cover having the strut interposed therein to measure the amount of displacement up to an outer peripheral portion of the bearing case.

9. The disc axis adjusting mechanism in a gas turbine according to claim 2,
wherein a partition plate is provided to demarcate a space between the strut cover and an inner peripheral surface of the casing wall in the circumferential direction, and
one strut is arranged within a region demarcated by the partition plate.

10. The disc axis adjusting mechanism in a gas turbine according to claim 3,
wherein a partition plate is provided to demarcate a space between the strut cover and an inner peripheral surface of the casing wall in the circumferential direction, and
one strut is arranged within a region demarcated by the partition plate.

11. The disc axis adjusting mechanism in a gas turbine according to claim 4,
wherein a partition plate is provided to demarcate a space between the strut cover and an inner peripheral surface of the casing wall in the circumferential direction, and
one strut is arranged within a region demarcated by the partition plate.

12. The disc axis adjusting mechanism in a gas turbine according to claim 2,
wherein a displacement sensor is provided in the casing wall to measure the displacement of the casing wall, and
air is blown against an outer peripheral surface of the casing wall on the basis of the displacement of the casing wall detected by the displacement sensor.

13. The disc axis adjusting mechanism in a gas turbine according to claim 3,
wherein a displacement sensor is provided in the casing wall to measure the displacement of the casing wall, and
air is blown against an outer peripheral surface of the casing wall on the basis of the displacement of the casing wall detected by the displacement sensor.

14. A disc axis adjusting mechanism in a gas turbine, the gas turbine having an exhaust gas diffuser having an outer diffuser and an inner diffuser provided between a casing wall and a bearing case which are connected to a downstream side of the turbine, a plurality of struts that couple the casing wall and the bearing case through the exhaust gas diffuser and are provided at intervals in a circumferential direction, and strut covers that couple the outer diffuser and the inner diffuser so as to cover the struts, the mechanism comprising:
- a plurality of air introduction holes formed in the casing wall so as to correspond to each of the struts, and allow the interior and exterior of the wall to communicate with each other;
- a second sensor unit configured to detect a clearance between a turbine blade and a turbine casing in the turbine; and
- a flow rate adjustor configured to adjust the flow rate of air flowing through each of the air introduction holes.

15. The disc axis adjusting mechanism in a gas turbine according to claim 14,
wherein the second sensor units are provided in a plurality of stages along a turbine axial direction.

16. The disc axis adjusting mechanism in a gas turbine according to claim 14,
wherein the strut is provided with a temperature sensor that detects the temperature of the strut.

17. The disc axis adjusting mechanism in a gas turbine according to claim 14,
wherein a displacement sensor is provided in the casing wall to measure the displacement of the casing wall, and air is blown against an outer peripheral surface of the casing wall on the basis of the displacement of the casing wall detected by the displacement sensor.

18. The disc axis adjusting mechanism in a gas turbine according to claim 15,
wherein the strut is provided with a temperature sensor that detects the temperature of the strut.

19. The disc axis adjusting mechanism in a gas turbine according to claim 15,
wherein a displacement sensor is provided in the casing wall to measure the displacement of the casing wall, and
air is blown against an outer peripheral surface of the casing wall on the basis of the displacement of the casing wall detected by the displacement sensor.

20. The disc axis adjusting mechanism in a gas turbine according to claim 16,
wherein a displacement sensor is provided in the casing wall to measure the displacement of the casing wall, and
air is blown against an outer peripheral surface of the casing wall on the basis of the displacement of the casing wall detected by the displacement sensor.

* * * * *